United States Patent [19]

Watanabe

[11] Patent Number: 4,990,952
[45] Date of Patent: Feb. 5, 1991

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 461,527

[22] Filed: Jan. 5, 1990

[30] Foreign Application Priority Data

Jan. 26, 1989 [JP] Japan .................. 1-17002

[51] Int. Cl.⁵ .............................................. G03B 27/50
[52] U.S. Cl. ........................................ 355/50; 355/317
[58] Field of Search .................... 355/50, 75, 317, 318; 271/226, 227, 245, 246

[56] References Cited

U.S. PATENT DOCUMENTS

3,623,806 11/1971 Short .................................. 355/317
4,043,550 8/1977 Phillips et al. ..................... 355/75 X
4,243,316 1/1981 Gustafson ............................. 355/75
4,281,919 8/1981 Nomura et al. ....................... 355/50

Primary Examiner—L. T. Hix
Assistant Examiner—D. Rutledge
Attorney, Agent, or Firm—Foley & Lardner, Schwartz, Jeffery, Schwaab, Mack, Blumenthal & Evans

[57] ABSTRACT

An image forming apparatus includes a document table on which a document is to be placed. The document table has first and second end portions opposed to each other. An exposure mechanism is arranged to be movable between the first and second end portions of the document table along therewith. The exposure mechanism projects light onto the document table to scan a document on the document table from the first end portion to the second end portion. A document placed on the document table is positioned by a positioning member so that one end of the document is aligned with the first end portion of the document table.

21 Claims, 11 Drawing Sheets

FIG. 11 ns can be simplified in terms of an control operation and an arrangement.

IMAGE FORMING APPARATUS

BACKGROUND OF THE INVENTION

1. Field of the Invention

The present invention relates to an image forming apparatus, such as an electronic copying machine, and, more particularly, to an image forming apparatus having a document feeding unit for automatically picking up a manually inserted document so as to set it on a document table, and discharging it upon formation of an image.

2. Description of the Related Art

In a conventional image forming apparatus of this type, a document feeding unit comprises a wide endless conveyor belt arranged at a cover portion overlapping a document table, and a belt driving mechanism for driving the conveyor belt. With this arrangement, a document which is manually inserted into a predetermined position is fed and set onto the document table or a document on the document table is discharged therefrom by driving the conveyor belt.

In the conventional image forming apparatus, when the document feeding unit is used, a document is set on the document table with reference to a right scale opposite to a left scale on the exposure start side which is used as a reference when a document is manually set.

With the conventional apparatus, document set positions with respect to the document table vary depending on whether a document is manually set or set by the document feeding unit. For this reason, when the document feeding unit is to be used, the exposure start position needs to be switched to the right reference, resulting in complicated control and structure of an exposure mechanism.

SUMMARY OF THE INVENTION

The present invention has been made in consideration of the above situation, and has as an object to provide an image forming apparatus wherein an exposure mechanism is simple in construction and can be easily controlled.

In order to achieve the above object, according to the present invention, there is provided an image forming apparatus comprising: a document table on which a document is to be placed, said document table having first and second end portions opposite to each other; exposure means, movable between said first and second end portions along said document table, for projecting light onto said document table to scan a document placed on the document table from said first end portion to said second end portion; and means for feeding a document onto said document table and positioning the document on said document table, with one end of the document aligned with said first end portion of said document table.

According to the image forming apparatus having the above-described arrangement, a document on the document table is position by the feeding means so that one end of the document is aligned with the first end portion of the document table, i.e., with the exposure start side of the exposure means. Therefore, a document can be set at the same position with respect to the document table in a manual set mode and in a mode using the document feeding unit. Since the exposure start position need not be switched to the other reference position when the document feeding unit is used, the exposure means can be simplified in terms of an control operation and an arrangement.

BRIEF DESCRIPTION OF THE DRAWINGS

FIGS. 1 to 11 show an image forming apparatus according to an embodiment of the present invention, in which:

DETAILED DESCRIPTION OF THE PREFERRED EMBODIMENTS

An embodiment of the present invention will be described below with reference to the accompanying drawings.

Figure 1:
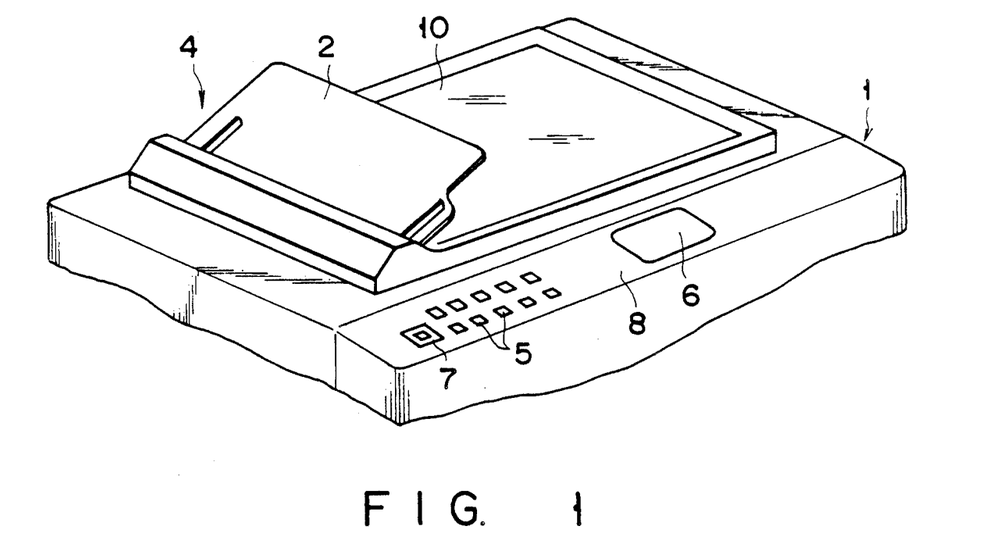
FIG. 1 is a schematic perspective view showing an outer appearance of an upper portion of the image forming apparatus with a platen cover being closed.
Figure 2:
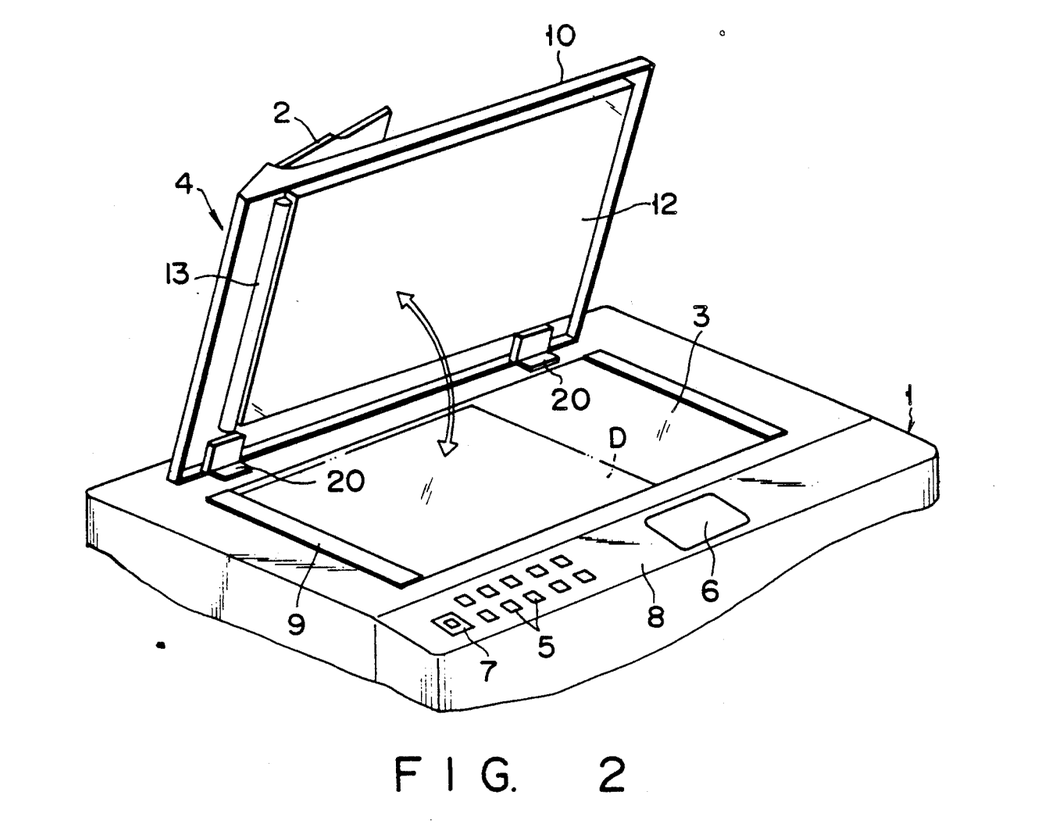
FIG. 2 is a schematic perspective view showing an outer appearance of the upper portion of the image forming apparatus with the platen cover being open.

FIGS. 1 and 2 show an arrangement of an upper portion of an image forming apparatus according to an embodiment of the present invention. This apparatus comprises an apparatus main body 1 incorporating image forming mechanism (not shown) for performing charging, exposure, development, transfer, cleaning, fixing, and the like. A rectangular platen glass 3 as a document table is provided on the upper surface of the main body 1. An elongated scale 9 as positioning means is arranged along one end of the platen glass 3, i.e., along the left edge of the platen glass. The scale 9 is supported by a support shaft 9a so as to pivot between an upper position above the level of the upper surface of the platen glass 3 as indicated by a broken line in FIG. 3 and a lower position below the same level as indicated by a solid line in FIG. 3. The scale 9 is biased by a biasing member (not shown) and normally held at the upper position. A document D having a maximum of A3 size (ledger size for an oversee developing unit) can be placed on the platen glass 3 using the scale 9 as a reference.

A platen cover 10 is arranged on the upper surface of the main body 1. The rear end of the cover 10 is fixed to the main body 1 through a pair of hinges 20. The cover 10 can rotatable between a closing position where it covers the platen glass 3 as shown in FIG. 1 and an opening position where the upper surface of the platen glass 3 is open a shown in FIG. 2. A platen sheet 12 as a document holder (to be described later) is attached to the lower surface of the cover 10. While the cover 10 is closed, the platen sheet 12 is in contact with the platen glass 3 so as to urge the document D against the platen glass 3. The hinges 20 respectively have support shafts (not shown) which are inserted in mount holes (not shown) formed in the upper surface of the main body 1. The cover 10 can be freely pulled upward from the main body 1, so that the platen sheet 12 of the platen cover 10 can be positioned in parallel to the platen glass 3 and uniformly urge a thick document to be copied such as a book against the platen glass.

A document feeding unit 4 (to be described later) is arranged at the end portion of the platen cover 10 adjacent to the scale 9. The unit 4 has a document tray 2 and is designed to automatically feed and set a document D, which is received along the document tray 2, onto the platen glass 3, and discharge a document on the platen glass 3 onto the upper surface of the cover 10.

An operation panel 8 is arranged on the front edge portion of the upper surface of the main body 1. The panel 8 has a ten-key pad 5, a guidance display portion 6, a copy key 7, and the like.

A paper cassette (not shown) is attached to the right side of the main body 1. The cassette houses paper such as plain paper to be fed to the image forming mechanism. A discharge tray 16 (see FIG. 11) is attached to the left side of the main body 1. Paper P on which images are fixed are stacked on the discharge tray 16.

Figure 3:
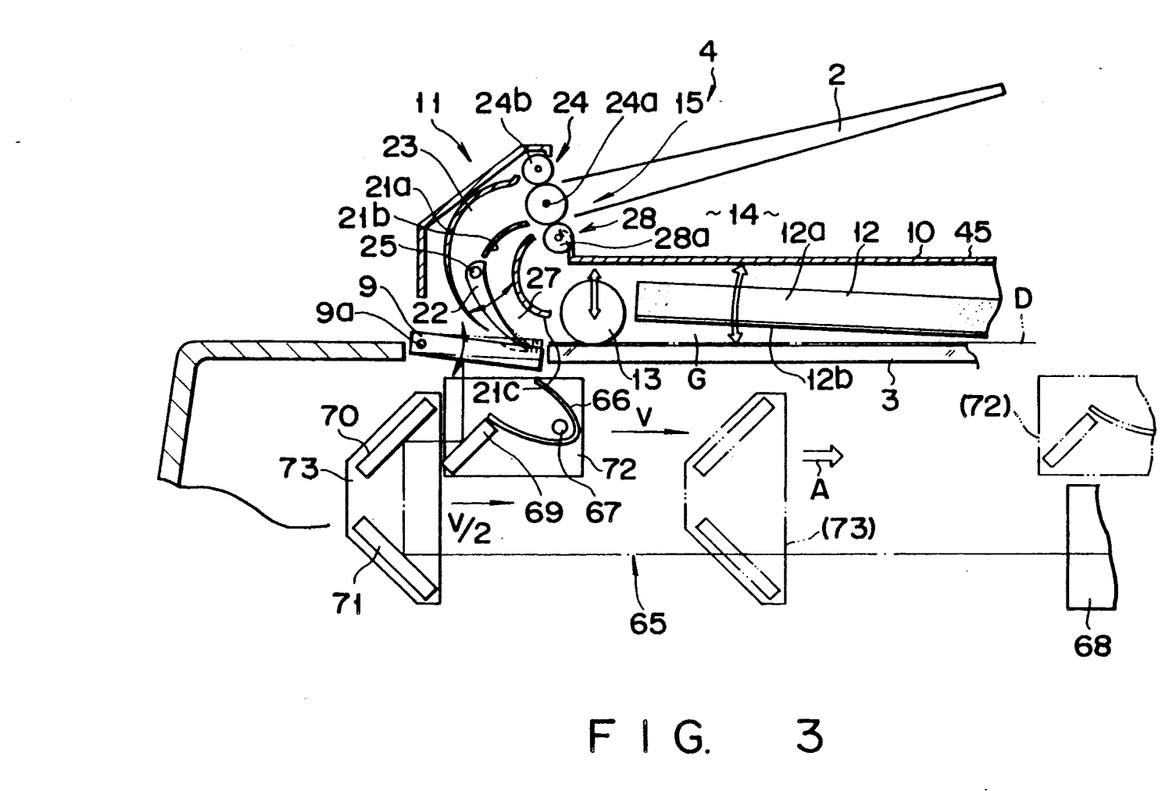
FIG. 3 is a sectional view showing a main part of a document feeding unit and its peripheral arrangement.

As shown in FIG. 3, the document feeding unit 4 comprises a pickup mechanism 11, a feed roller 13 as a document transfer means, and a document discharge mechanism 15. The pickup mechanism 11 automatically picks up a document D which is manually inserted through the document tray 2. The feed roller 13 receives the document D picked up by the pickup mechanism 11, feeds it between the platen sheet 12 and the platen glass 3, and sets it on the platen glass by using the scale 9 as a reference. In addition, the feed roller 13 discharges the document D, which is set on the platen glass 3, from the portion between the platen sheet 12 and the platen glass 3 after completion of a copy operation. The document discharge mechanism 15 receives the document D discharged by the feed roller 13 and discharges it onto a document discharge portion 14 constituted by the upper surface of the platen cover 10. Note that the document tray 2 obliquely extends upward from the end portion of the cover 10 on the scale 9 side toward the opposite end portion of the cover 10, and the document discharge portion 14 is defined between the tray 2 and the upper surface of the cover 10.

Figure 4:
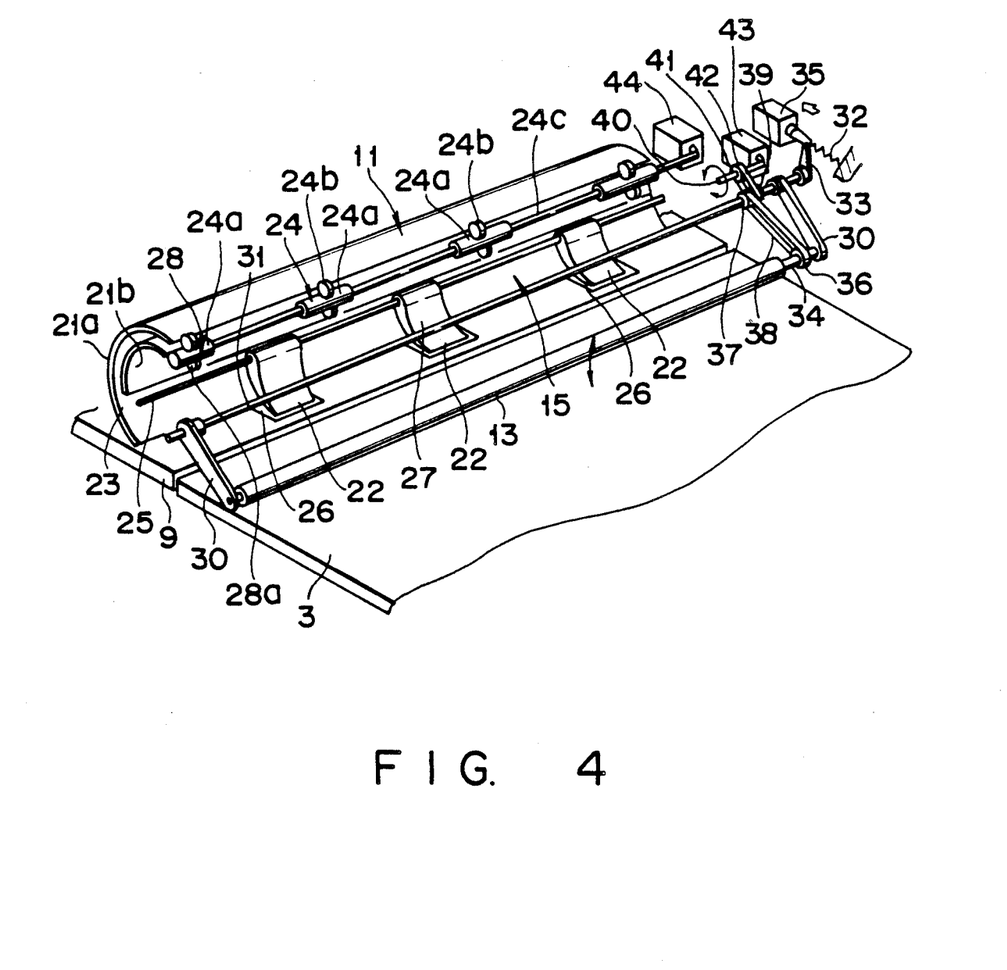
FIG. 4 is a schematic perspective view showing the document feeding unit.

As shown in FIGS. 3 and 4, the pickup mechanism 11 comprises a guide plate 21a extending from the proximal end of the tray 2 to a position near the scale 9 so as to form a curve, a guide plate 21b extending from the proximal end of the tray 2 so as to oppose the guide plate 21a, and a plurality of movable guides 22 extending from the lower end of the guide plate 21b to a position near the scale 9. The guide plates 21a and 21b and the movable guides 22 define a document pickup path 23 extending from the tray 2 to a position near the scale 9. The movable guides 22 are arranged along the longitudinal direction of the scale 9 and are rotatably supported by a shaft 25. A roller mechanism 24 is arranged at the proximal end portion of the path 23. The roller mechanism 24 includes a plurality of drive rollers 24a and a plurality of pinch rollers 24b which are in rotatable contact with the rollers 24a, respectively. The driving rollers 24a are fixed to a rotating shaft 24c extending in the longitudinal direction of the scale 9 and spaced from each other. The rotating shaft 24c is rotated in the forward/reverse direction by a motor 44 attached to the cover 10.

The document discharge mechanism 15 includes a guide plate 21c extending from the proximal end of the tray 2 to a position near the left edge of the platen glass 3 so as to form a curve. The guide plate 21c is positioned to oppose the guide plate 21b and the movable guides 22. In cooperation with the guide plate 21b and the guides 22, the guide plate 21c defines a discharge path 27 extending from the left edge of the platen glass 3 to the discharge portion 14. A plurality of pinch rollers 28a are arranged at the end of the discharge path 27 and in rotatable contact with the drive rollers 24a. A discharge roller mechanism 28 is constituted by the drive rollers 24a and the pinch rollers 28a. As described above, the pickup roller mechanism 24 and the discharge roller mechanism 28 are constituted by using the common drive rollers 24a.

Each movable guide 22 is normally at its lower position by its own weight or a small biasing force, and its lower end is inserted in a corresponding recess 26 formed in the upper surface of the scale 9. When a document D is fed to the movable guides 22 through the pickup path 23, the movable guides 22 are pushed by the leading edge of the document D and are easily rotated upward. As a result, the document D can be introduced to the feed roller 13. In contrast to this, when the document D is discharged from the platen glass 3 by the feed roller 13, the movable guides 22 close the outlet of the pickup path 23 so as to prevent the document D from returning to the path 23. Therefore, the document D is reliably guided into the discharge path 28 by the movable guides 22.

As shown in FIGS. 3 and 4, the feed roller 13 as a transfer means is capable of contacting the upper surface end portion of the platen glass 3 on the scale 9 side, and extends parallel to the scale 9. Both end portions of a roller shaft 34 of the roller 13 protrude from both the ends of the roller 13 and are respectively supported by the free ends of pivot arms 30. The proximal ends of the arms 30 are fixed to a pickup shaft 31. The shaft 31 is rotatably supported by the cover 10 and extends parallel to the roller 13. A link 33 is fixed to one end of the shaft 31, and a tension spring 32 is hooked between the link 33 and the cover 10. With this arrangement, the shaft 31 is rotated by the biasing force of the spring 32, and the roller 13 is held at a lower position where it is in contact with the platen glass 3. In addition, the link 33 is connected to a solenoid-plunger 35 attached to the cover 10. Upon energization, the solenoid-plunger 35 causes the link 33 and the shaft 31 to pivot against the biasing force of the spring 32, thereby moving the roller 13 to an upper position where it is separated from the platen glass 3.

Pulleys 37 and 39 integrally formed therewith are rotatably attached to the shaft 31, and a pulley 36 is attached to the roller shaft 34. A timing belt 38 is looped around the pulleys 37 and 36. A drive shaft 40 is rotatably supported by the cover 10 and extends parallel to the shaft 31. A pulley 41 is fixed to the drive shaft 40, and a timing belt 42 is looped around the pulleys 41 and 39. The drive shaft 40 is coupled to a motor 43 attached to the cover 10. Thus, the roller 13 can be rotated in the forward/reverse direction by driving the motor 43 in the forward/reverse direction.

Figure 5:
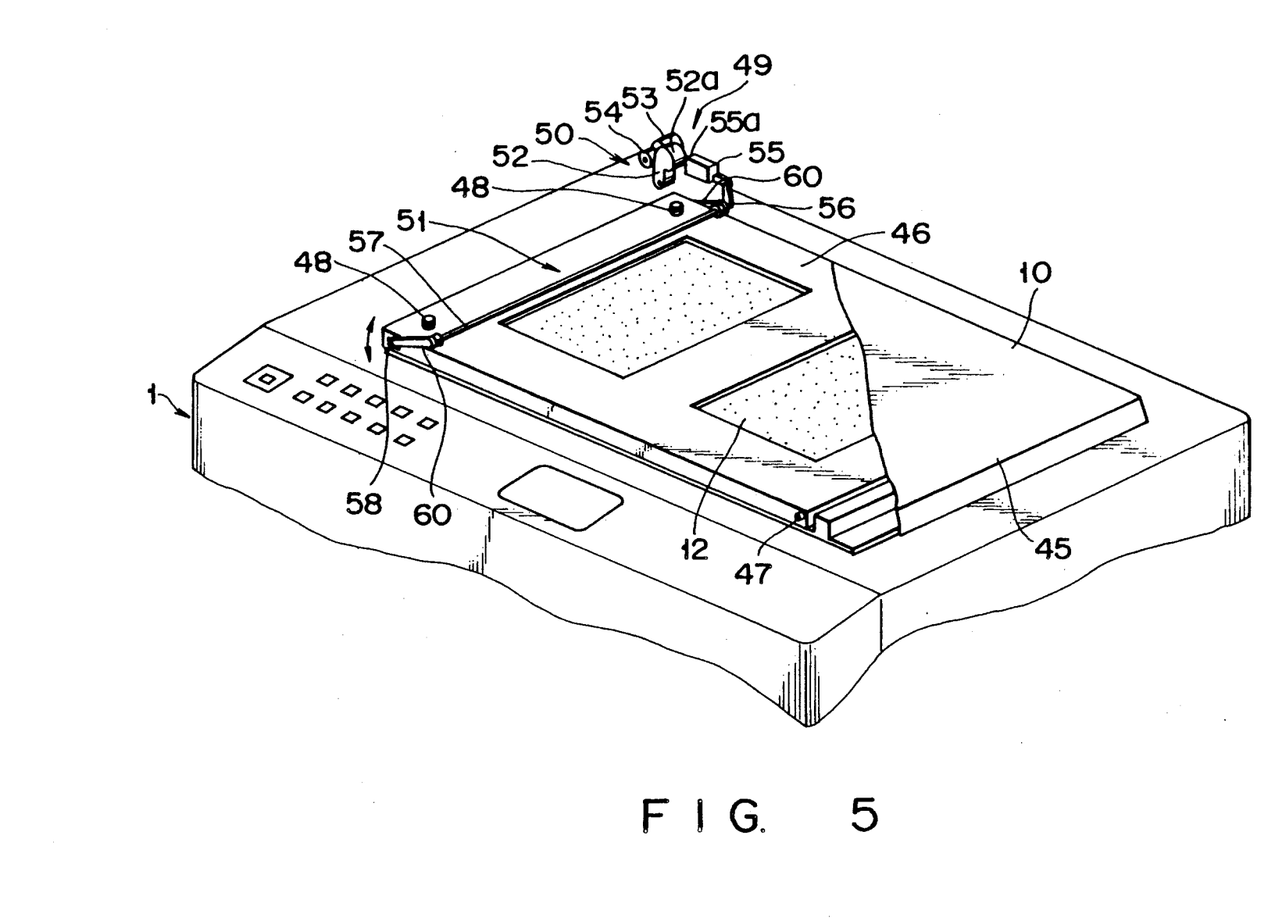
FIG. 5 is a schematic perspective view showing the platen cover and a holder driving means.

The platen cover 10 has an arrangement shown in FIGS. 2 and 5. More specifically, the platen sheet 12 is formed into a rectangular shape having substantially the same size as that of the platen glass 3. The sheet 12 includes an elastic member 12a such as an urethane member, and a white sheet 12b having a low friction coefficient which is bonded to the lower surface of the elastic member 12a.

The platen sheet 12 except for its lower surface, is covered with a cover body 45 whose rear end is fixed to the main body 1 through the hinges 20. The platen sheet 12 is bonded to a movable frame 46 which is rotatably supported by the cover body 45.

Figure 6:
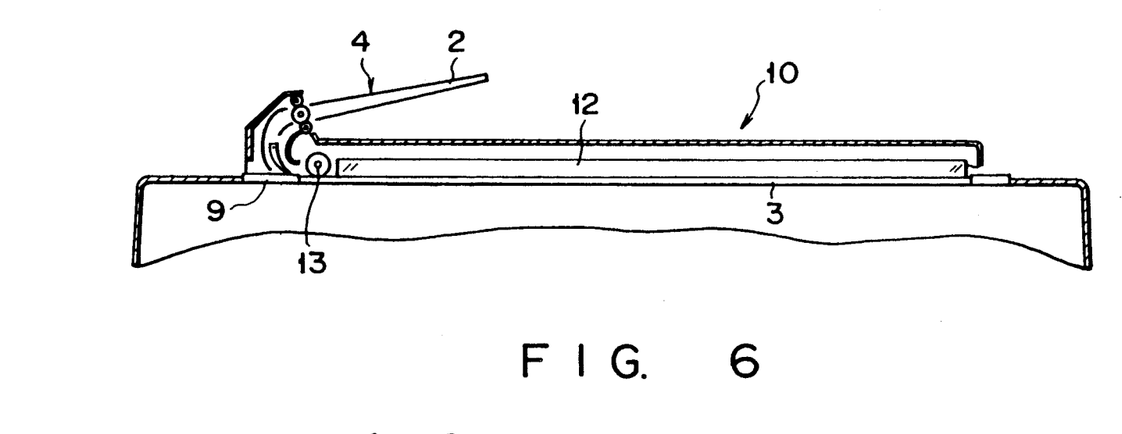
FIG. 6 is a schematic sectional view showing a state wherein the platen cover is closed and a platen sheet is in tight contact with a platen glass.

As shown in FIG. 5, the movable frame 46 is supported, by a pair of support shafts 47 as a rotational axis, at the right end portion of the cover body 45, i.e., at the end portion opposite to the scale 9. A pair of compression springs 48 are arranged between the cover body 45 and the end portion of the upper surface of the movable frame 46 on the scale 9 side (left end of the upper surface). These springs 48 normally bias the left end of the movable frame 46 downward to hold the frame 46 in a horizontal state. As shown in FIG. 6, therefore, the entire lower surface of the platen sheet 12 is normally in tight contact with the platen glass 3.

Figure 7:
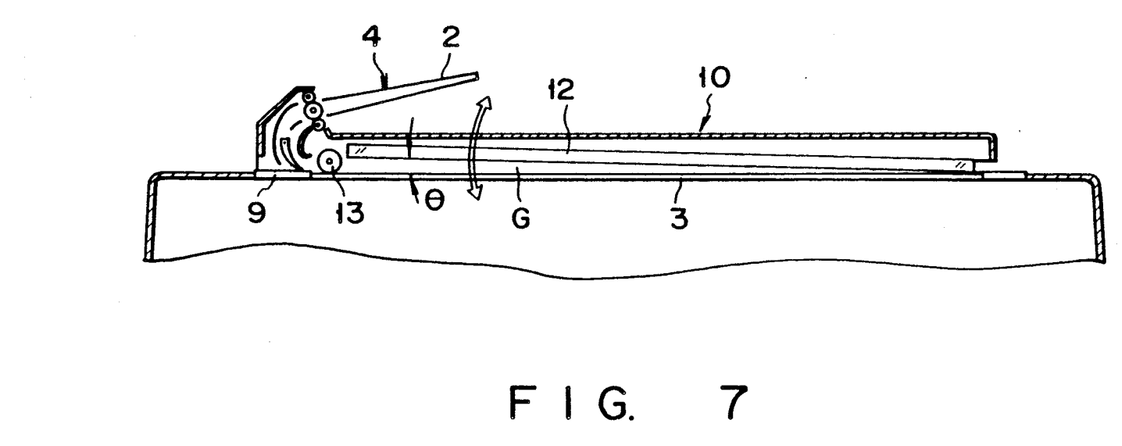
FIG. 7 is a schematic sectional view showing a state wherein the platen cover is closed and a gap is defined between the platen sheet and the platen glass.

The movable frame 46 can be rotated by a holder drive device 49 (to be described later) through a predetermined angle from a lower position shown in FIG. 6 in a direction to be separated from the platen glass 3 against the biasing force of the springs 48. When the platen sheet 12 is rotated to an upper position as shown in FIG. 7, a gap G having a angle θ is defined between the lower surface of the platen sheet 12 and the platen glass 3.

As shown in FIG. 5, the holder drive device 49 comprises a drive mechanism 50 and a power transmission mechanism 51 for transmitting power generated by the mechanism 50 to he movable frame 46.

The drive mechanism 50 comprises a rotatable pusher 52 fixed to the cover 10, and an eccentric cam roller 54 using a cam motor 53 as its drive source. The pusher 52 is rotated by the cam roller 54 so as to cause an upper end projection 52a to protrude/withdraw with respect to the platen cover 10 side. The pusher 52 is normally biased by a basing member (not shown) so as to contact the outer surface of the cam roller 54.

The power transmission mechanism 51 comprises a slider 55 having one end face 55a opposite to the projection 52a of the pusher 52. The slider 55 is attached to the cover 10 so as to be reciprocated along the direction in which the projection 52a of the pusher 52 protrudes/withdraws. The other end face of the slider 55 is coupled to one end of the rotary shaft 57 through a link 56. The shaft 57 is rotatably supported by the cover body 45 and extends through a space between the body 45 and the movable frame 46 so as to be parallel to the feed roller 13. Pivot levers 60 are respectively fixed to both ends of the shaft 57 and are rotated integrally with the shaft 57. Guide rollers are respectively attached to the distal ends of the levers 60 and are engaged with guide grooves 58 which are formed in side surfaces of the end portion of the movable frame 46 located near the scale 9. The sliding movement of the slider 55 is converted into the rotational movement of the shaft 57 by the link 56, so that the pivot levers 60 attached to the shaft 57 are rotated through a predetermined angle.

In the holder drive device 49 having the above-described arrangement, the eccentric cam roller 54 is normally stopped in a state wherein its minimum eccentric portion is in contact with the pusher 52, and hence the end face 55a of the slider 55 is not biased by the cam roller 54. In this state, no force is generated to raise the free end of the movable frame 46, and the frame 46 is biased downward by the compression springs 48 so as to take a horizontal posture. As a result, the platen sheet 12 is held at the lower position where its entire lower surface is in tight contact with the platen glass 3.

When a feed timing or a discharge timing of a document D comes, the cam motor 53 is driven in response to a signal from a control section (not shown) so as to rotate the eccentric cam roller 54 through 180°. The cam roller 54 is then stopped in a state wherein its maximum eccentric portion is in contact with the pusher 52. As a result, the pusher 52 is rotated to urge the projection 52a against the slider 55. As described above, the sliding movement of the slider 55 is converted into the rotational movement of the levers 60, so that the free end of the movable frame 46 is lifted against the biasing force of the compression springs 48. As a result, the platen sheet 12 is moved to the upper position where it is separated from the platen glass 3, and the gap G of the angle θ is defined between the lower surface of the platen sheet 12 and the platen glass 3.

As shown in FIG. 3, an exposure optical system 65 as an exposure means is arranged below the platen glass 3. The optical system 65 scans a document D set on the platen glass 3 and forms an image (corresponding to the document D) on an image carrier (not shown).

The exposure optical system 65 comprises an exposure lamp 67, having a rear portion enclosed with a reflector 66, for radiating light on a document D, first to third mirrors 69, 70, and 71 for receiving light reflected by the document D and guiding it to a lens 68, and fourth and fifth mirrors (not shown) for guiding the light passing through the lens 68 onto the image carrier. The exposure lamp 67 and the first mirror 69 are mounted on a first carriage 72, whereas the second and third mirrors 70 and 71 are mounted on a second carriage 73. These carriages 72 and 73 are moved by a carriage drive mechanism (not shown) in a direction indicated by an arrow A in FIG. 3 in such a manner that the first carriage 72 is moved at a speed V; and the second carriage 73, at a speed v/2. With a constant optical path, the optical system 65 scans and exposes the document D on the platen glass 3 from the scale 9 side in the direction indicated by the arrow A, and returns to a home position indicated by a solid line in FIG. 3. Note that since this exposure operation and an image forming operation upon exposure are known, a detailed description thereof will be omitted.

Feed and discharge operation of a document D with respect to the platen glass 3 by using the document feeding unit 4 will be described below.

Figure 8A:
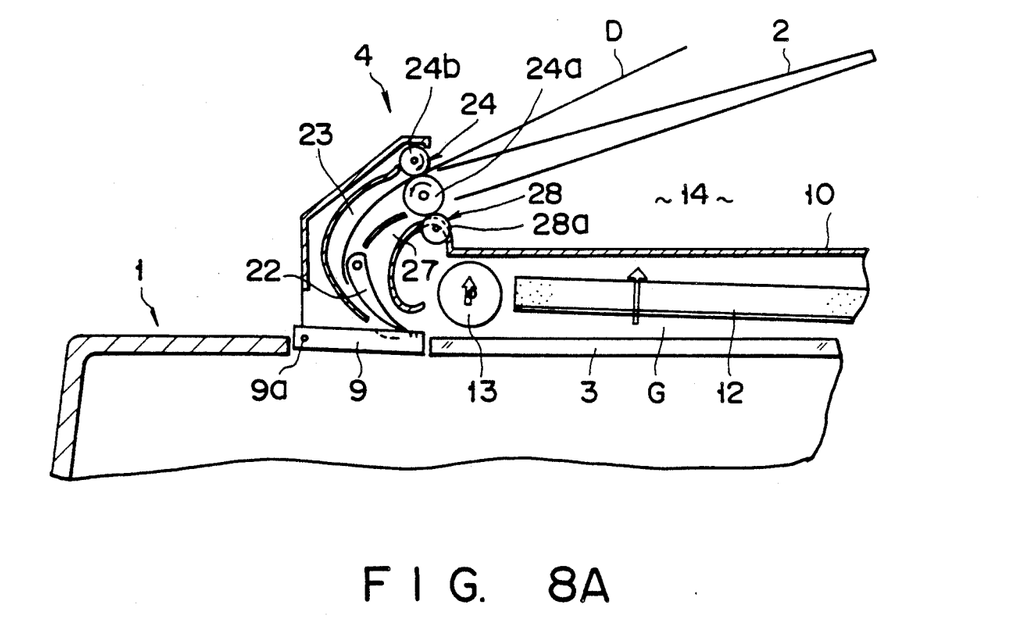
FIGS. 8A to 8G are views for explaining an operation of the document feeding unit.
Figure 9:
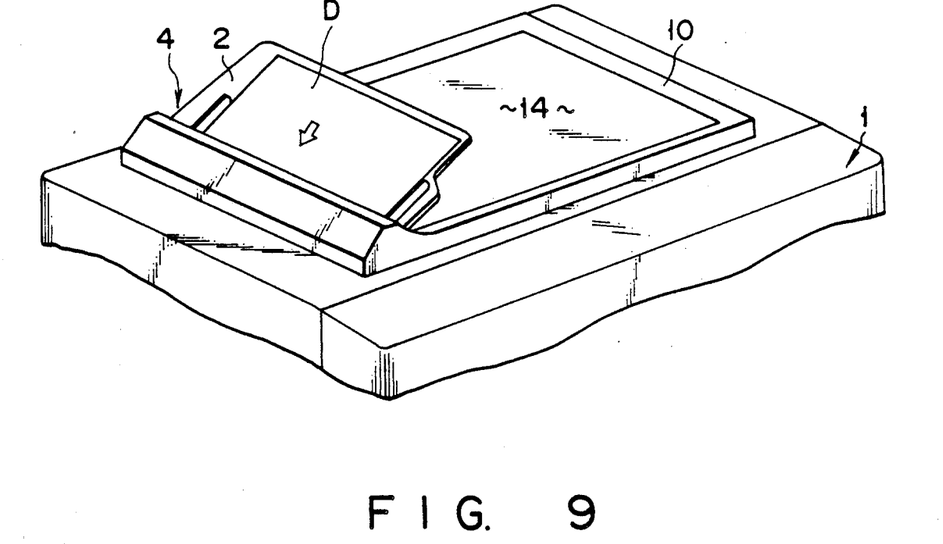
FIG. 9 is a schematic perspective view showing a document feed state.

As shown in FIGS. 8A and 9, a document D, which is manually inserted through the document tray 2, is taken into the pickup path 23 by the pickup roller mechanism 24. At this time, the feed roller 13 and the platen sheet 12 are set at their upper positions. The leading edge of the taken document D advances while urging the movable guides 22 upward and moves to a position under the feed roller 13. In this case, the left scale 9 is rotated upward.

Figure 8B:
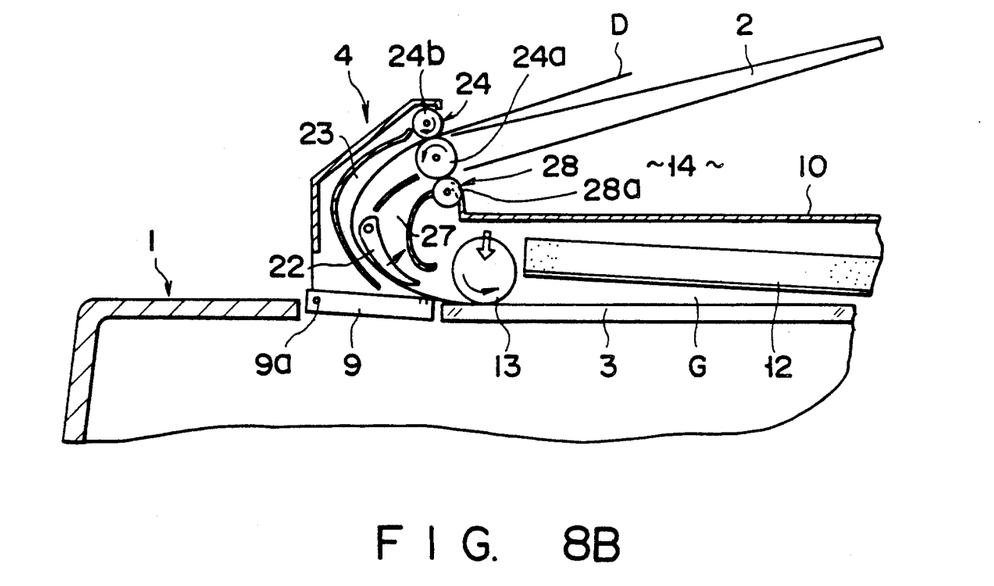

As shown in FIG. 8B, while rotating in the forward direction, the feed roller 13 is moved downward to contact the document D. Upon rotation of the roller 13, the document D is transferred in the right direction on the platen glass 3. At this time, the gap G is defined between the platen glass 3 and the platen sheet 12. In addition, since the platen glass 3 and the white sheet 12b of the platen sheet 12 are constituted by low-friction members. Accordingly, the document D is smoothly fed without a bend or the like.

Figure 8C:
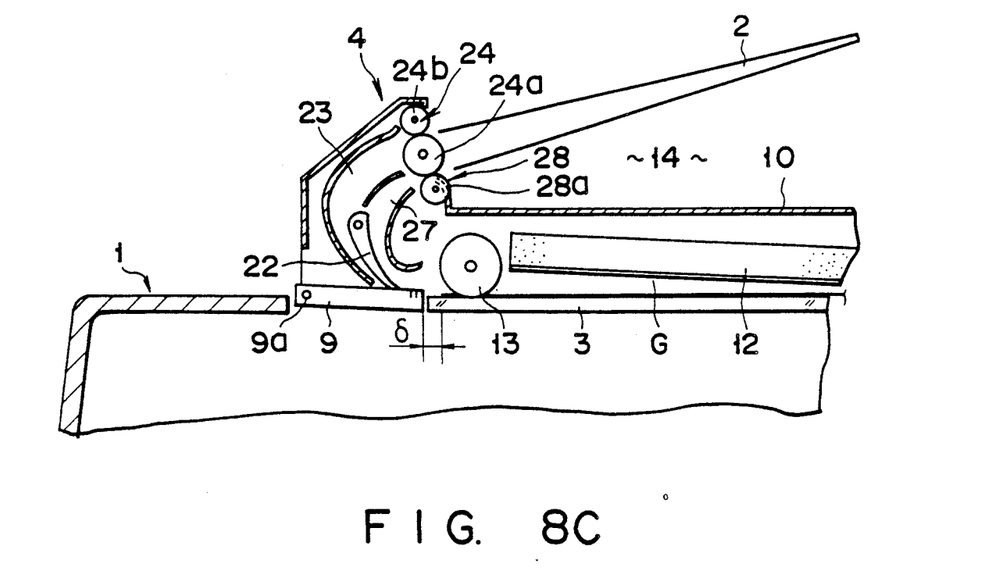
Figure 8D:
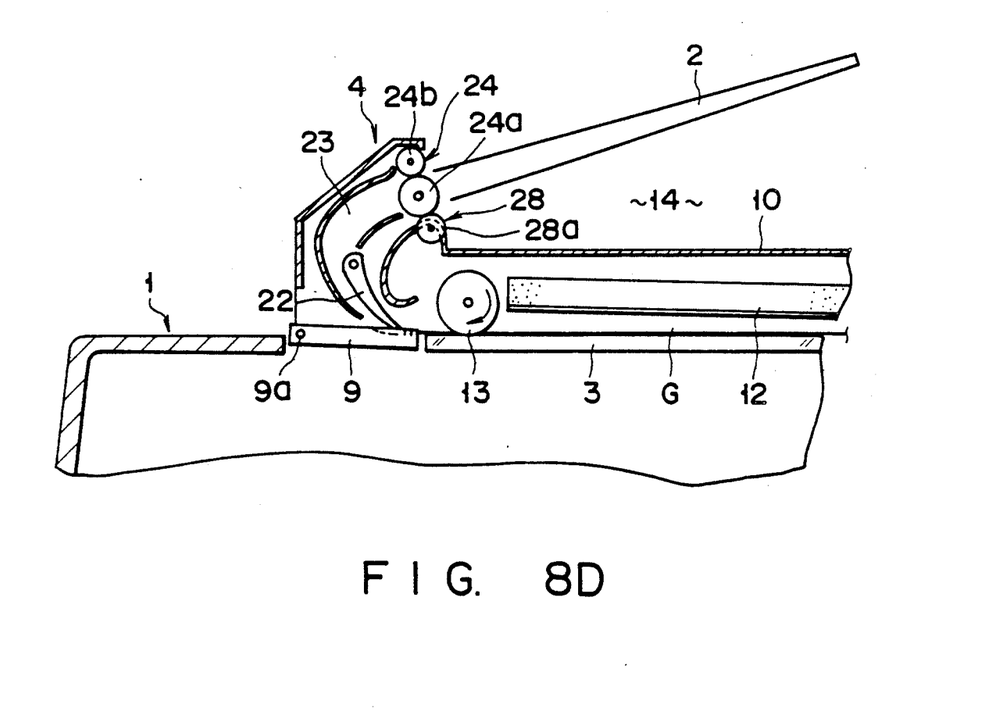
Figure 8E:
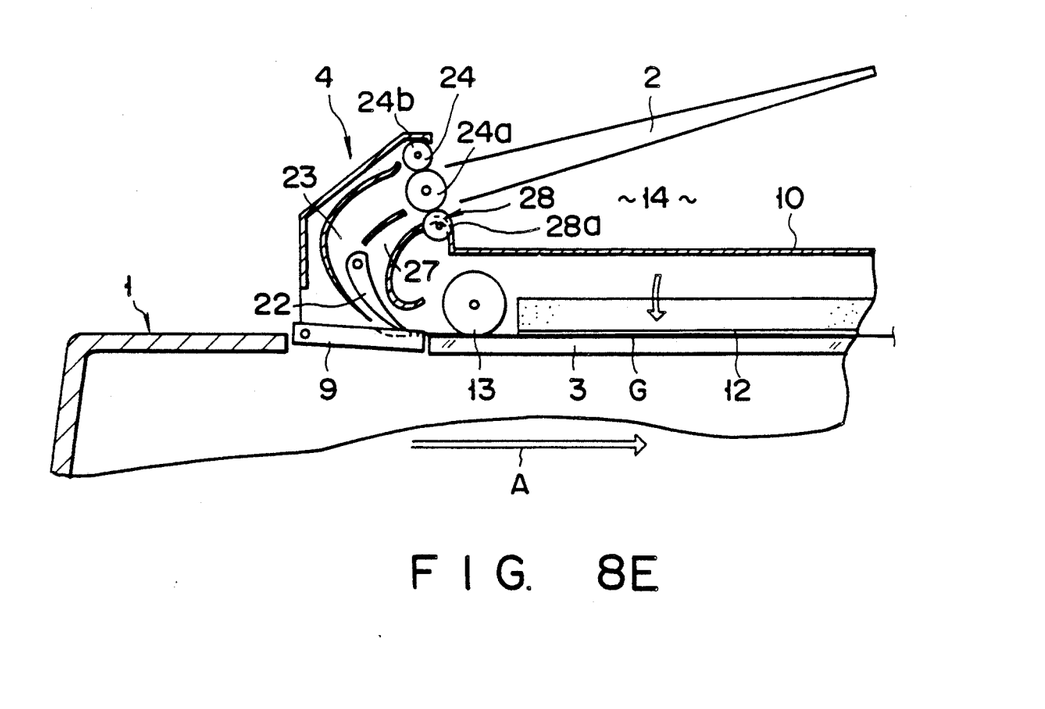

As shown in FIG. 8C, when the trailing edge (left end) of the document D reaches a position which is spaced from the end face of the scale 9 by a small distance δ in the right, the feed roller 13 is stopped. Subsequently, the roller 13 is rotated in the reverse direction so as to cause the trailing edge of the document D to abut against the end face of the scale 9, thereby performing positioning of the document D and skew correction, as shown in FIG. 8D. As shown in FIG. 8E, the platen sheet 12 is moved to its lower position, thereby to bring the document D into tight contact with the platen glass 3. In this state, the exposure optical system shown in FIG. 3 is moved in the direction indicated by the arrow A to exposure and scan the image on the document D.

Figure 8F:
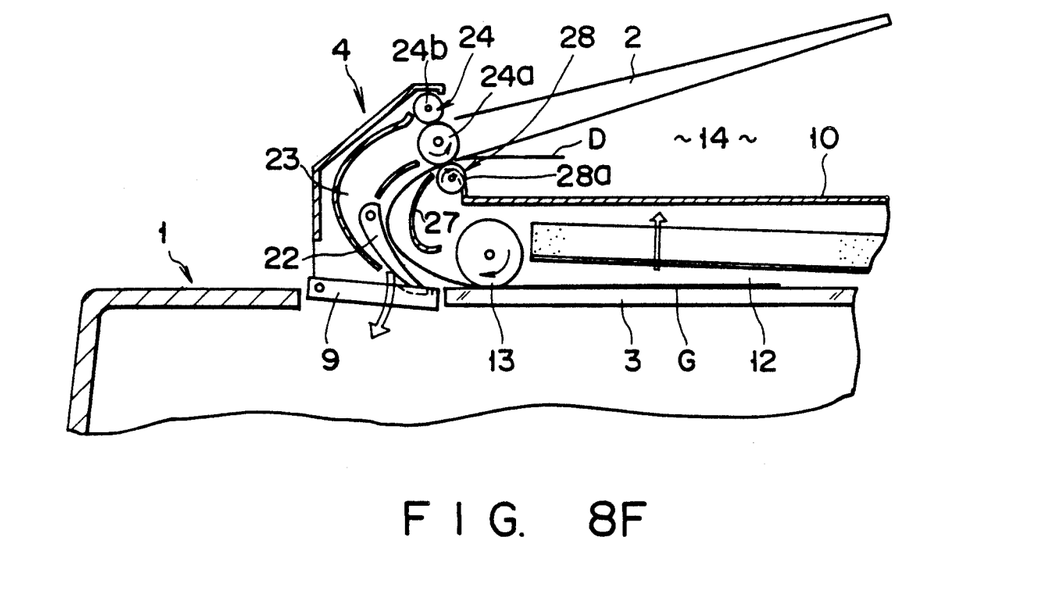
Figure 10:
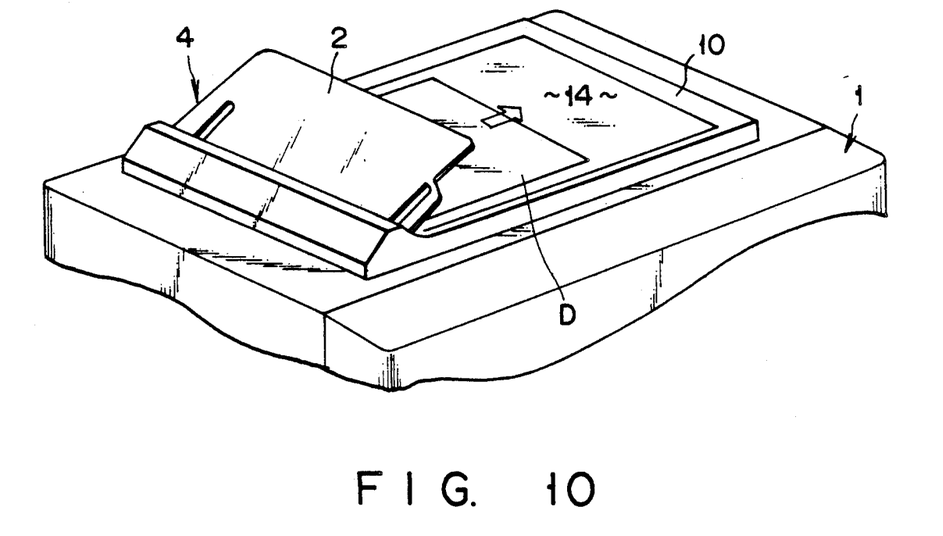
FIG. 10 is a schematic perspective view showing a document discharge state.

When this document scan is completed, the platen sheet 12 is moved to its upper position to define the gap G, and the scale 9 is moved to the lower position, as shown in FIG. 8F. Thereafter, the feed roller 13 is rotated in the reverse direction to transfer the document D to the left. The document D is guided into the document discharge path 27 by the movable guides 22, and is discharged onto the document discharge portion 14 on the upper surface of the platen cover 10 by the discharge roller mechanism 28, as shown in FIGS. 8G and 10.

Figure 8G:
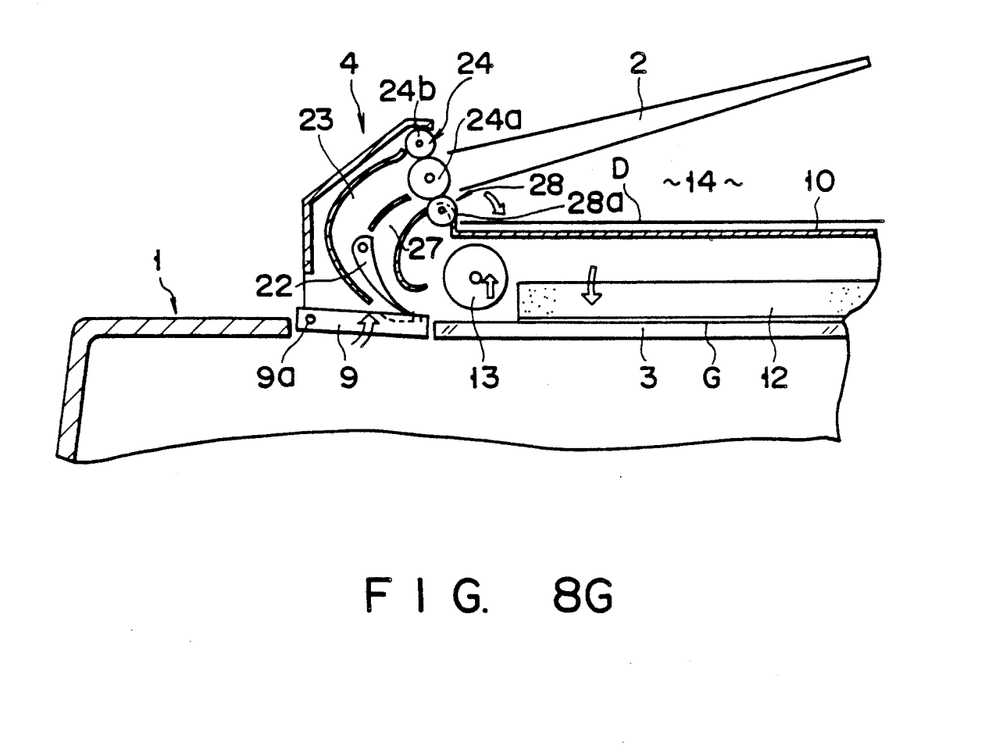

When the document D is discharged by the discharge roller mechanism 28, the feed roller 13 and the scale 9 are respectively restored to the upper positions, as shown in FIG. 8G. In addition, the platen sheet 12 is moved to the lower position.

Subsequently, the same operation as described above will be performed.

Since a copy operation of the document D which is set on the platen glass 3 is known, a detailed description thereof will be omitted.

According to the image forming apparatus having the above-described arrangement, the document feeding unit includes the document pickup means, the document discharge means, and the feed roller 13 for feeding and discharging a document onto and from the platen glass 3, and is arranged at one end portion of the platen cover 10, more specifically, the end portion near the scale 9. In this apparatus, a wide conveyor belt, a belt drive mechanism, and the like, which are required in a conventional apparatus, become unnecessary. Therefore, the document feeding unit can be simplified in arrangement, and can be decreased in weight and manufacturing cost. In addition, with the decrease in weight of the document feeding unit, the overall weight of the platen cover 10 can be decreased. Hence, the platen cover 10 can be opened and closed in the same manner as a normal platen cover having no document feeding unit. Moreover, the operability of the platen cover 10 with respect to a thick document such as a book can be improved.

When a document is to be fed or discharged, the document is set between the feed roller 13 and the platen glass 3, and at the same time the platen sheet 12 is moved to the upper position separated from the platen glass 3. With this operation, document feed can be reliably and smoothly performed, and hence the operation reliability of the document feeding unit is improved.

Further, the document feeding unit is arranged near the scale 9 which is used as a positioning reference when a document is manually set on the platen glass 3. With this arrangement, document set positions with respect to the platen glass 3 for manual setting and setting by means of the document feeding unit coincide with each other, requiring no change in exposure start position of a document. Therefore, the arrangement and operation control of the exposure means can be simplified.

The document pickup roller mechanism 24 and the document discharge roller mechanism 28 of the document feeding unit are constituted by using a common drive rollers 24a. Therefore, these roller mechanisms can be reduced in manufacturing cost and size, and the document feeding unit can be further reduced in weight and size.

Figure 11:
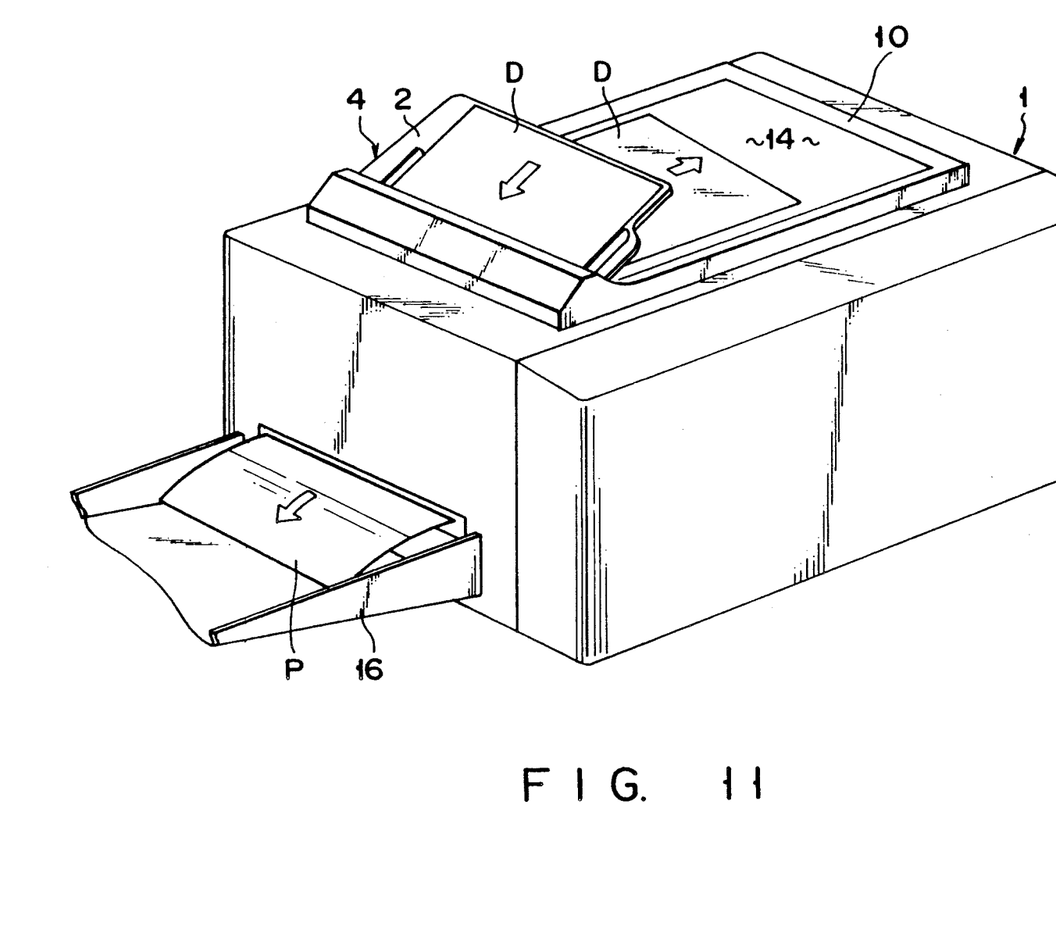
FIG. 11 is a perspective view showing feed state and discharge states of a document D, and a discharge state of paper P on which image is copied.

Moreover, as shown in FIG. 11, on the left end portion of the main body 1 are concentrated the document tray 2 for guiding manual insertion of a document, the discharge portion 14 for stocking documents after exposure, and the discharge tray 16 onto which paper P on which an image is fixed is discharged. Therefore, an operator can set a document and remove the discharged document and copy paper P at the same position without moving to other positions. Therefore, the operability of the image forming apparatus can be greatly improved.

What is claimed is:

1. An image forming apparatus comprising:
a document table on which a document is to be placed, said document table having first and second end portions opposite each other;
exposure means, movable between said first and second end portions along said document table, for projecting light onto said document table to scan a document placed on said document table from said first end portion to said second end portion; and
means for feeding a document onto said document table and positioning the document table, with one end of the document aligned with said first end portion of said document table;
wherein said feeding means includes an elongate positioning member located close to said first end portion of said document table and aligned with said first end portion, said positioning member being movable between a first position wherein it feeds a document onto said document table and a second position wherein one end of a document table is capable of abutting the positioning member.

2. An apparatus according to claim 1, which further comprises cover means arranged above said document table to be movable between an opening position for opening said document table and a closing position for covering said document table, said cover means having holding means for holding a document placed on said document table when said cover means is in the closed position.

3. An apparatus according to claim 2, wherein said feeding means includes pickup means provided on said cover means for guiding a document to a position near said first end portion of said document table;
transfer means arranged near said first end portion of said document table and supported by said cover means, for transferring the guided document to a portion between the document table and the holding means from said first end portion, setting the transferred document at a position where its one end abuts against said positioning member, and discharging a document located between the document table and the holding means from said first end portion to the outside of the apparatus; and discharge means for discharging the discharged document onto said cover means.

4. An apparatus according to claim 3, wherein said transfer means includes a feed roller supported by said cover means to be movable between a lower position wherein it is brought into contact with said document table and an upper position wherein it is separated from said document table, and roller drive means for moving said feed roller to the upper position when a document is guided to said first end portion of said document table by said pickup means.

5. An apparatus according to claim 3, wherein said pickup means comprises a pickup roller mechanism having a drive roller and a pinch roller which is in contact therewith, and a first document guide path extending from the pickup roller mechanism to a position near the transfer means, and said discharge means comprises a discharge roller mechanism having a drive roller and a pinch roller which is in contact therewith, and a second document guide path extending from the discharge roller mechanism to a position near the transfer means, said drive rollers of said pickup means and discharge means being a common roller.

6. An apparatus according to claim 5, wherein said pickup means comprises a first guide plate extending from the pickup roller mechanism to a position near said one end portion of the document table, a second guide plate extending from the pickup roller mechanism so as to oppose said first guide plate, and a movable guide plate extending from a distal end of the second guide plate to a position near said one end portion of the document table, the first document guide path being defined between the first guide plate and the second and movable guide plates.

7. An apparatus according to claim 6, wherein said discharge means comprises a third guide plate extending from the discharge roller mechanism to a position near said one end portion of the document table so as to oppose the second guide plate and the movable guide plate, the second document guide path being defined between the second and movable guide plates and the third guide plate.

8. An apparatus according to claim 7, wherein said movable guide plate is arranged to close a terminal end of the first document guide path and to be rotatable so as to open the terminal end of the first document guide path when the movable guide plate is urged by a document fed through the first document guide path.

9. An apparatus according to claim 3, wherein said holding means comprises a document holder having substantially the same size as that of the document table and supported by the cover means to be movable between a lower position where the holder is brought into contact with the document table and an upper position where it is separated from the document table, and document holder drive means for moving the document holder to the upper position when a document is transferred and discharged by said transfer means.

10. An apparatus according to claim 9, wherein said document holder comprises a stationary end portion rotatably supported by the cover means, and a movable end portion located near the transfer means and rotatable about the stationary end portion in directions to approach and to separate from the document table.

11. An apparatus according to claim 3, wherein said cover means comprises a first end portion located to oppose said one end portion of the document table, and a second end portion separated from the first end portion, and said feeding means comprises document guide means extending from the first end portion toward the second end portion of the cover means, for guiding a document to the pickup means, and a document discharge portion defined between the document guide means and the cover means, for stacking the document discharged by the discharge means.

12. An apparatus according to claim 2, wherein said cover means comprises a cover body for supporting the document holder means, and a support member for rotatably supporting the cover body, said support member being arranged to be movable in a direction in which the cover means is separated from the document table.

13. An image forming apparatus comprising:

a document table on which a document is to be placed, said document table having first and second end portions opposite to each other;

exposure means, movable between said first and second end portions along said document table, for projecting light on the document table to scan a document placed on the document table from said first end portion to said second end portion;

cover means arranged above said document table to be movable between an opening position for opening said document table and a closed position for covering said document table; and means for feeding a document onto and from said document table, said feeding means including:

pickup means provided on said cover means, for guiding a document to a position near said first end portion of said document table, transfer means arranged near said first end portion of said document table and supported by said cover means, for transferring the guided document onto said document table from said first end portion, positioning the transferred document on said document table, with one end of the document aligned with said first end portion of said document table, and discharging the document located on said document table from said first end portion to the outside of the apparatus, and discharge means for discharging the discharged document onto said cover means.

14. An apparatus according to claim 13, wherein said transfer means including a feed roller supported by said cover means to be movable between a lower position wherein it is brought into contact with said document table and an upper position wherein it is separated from said document table, and roller drive means for moving said feed roller to the upper position when a document is guided to said first end portion of said document table by said pickup means.

15. An apparatus according to claim 13, wherein said pickup means comprises a pickup roller mechanism having a drive roller and a pinch roller which is in contact therewith, and a first document guide path extending from the pickup roller mechanism to a position near the transfer means, and said discharge means comprises a discharge roller mechanism having a drive roller and a pinch roller which is in contact therewith, and a second document guide path extending from the discharge roller mechanism to a position near the transfer means, said drive rollers of said pickup means and discharge means being a common roller.

16. An apparatus according to claim 13, wherein said cover means comprises a first end portion located to oppose said one end portion of the document table, and a second end portion separated from the first end portion, and said feeding means comprises document guide means extending from the first end portion toward the second end portion of the cover means, for guiding a document to the pickup means, and a document discharge portion defined between the document guide means and the cover means, for stacking the document discharged by the discharge means.

17. An apparatus according to claim 13, wherein said cover means comprises a cover body for supporting the document holder means, and a support member for rotatably supporting the cover body, said support member being arranged to be movable in a direction in which the cover means is separated from the document table.

18. An apparatus according to claim 13, wherein said feeding means includes holding means supported by said cover means, for holding a document placed on said document table when said cover means is in the closed position.

19. An apparatus according to claim 14, wherein said holding means comprises a document holder having substantially the same size as that of the document table and supported by the cover means to be movable between a lower position where the holder is brought into contact with the document table and an upper position where it is separated from the document table, and document holder drive means for moving the document holder to the upper position when a document is transferred and discharged by said transfer means.

20. An image forming apparatus comprising:
a document table on which a document is to be placed, said document table having first and second end portions opposite to each other;
cover means arranged above said document table to be movable between an opening position for opening said document table and a closed position for covering said document table; and
means for feeding a document onto and from said document table, said feeding means including:
pickup means provided on said cover means, for guiding a document to a position near said first end portion of said document table,
transfer means arranged near said first end portion of said document table and supported by said cover means, for transferring the guided document onto said document table from said first end portion, positioning the transferred document on said document table, with one end of the document aligned with said first end portion of said document table, and discharging the document located on said document table from said first end portion to the outside of the apparatus, and
discharge means for discharging the discharged document onto said cover means.

21. An image forming apparatus comprising:
a document table on which a document is to be placed, said document table having first and second end portions opposite to each other;
cover means arranged above said document table to be movable between an opening position for opening said document table and a closed position for covering said document table; and
means for feeding a document onto and from said document table, said feeding means including:
pickup means provided on said cover means, for guiding a document to a position near said first end portion of said document table,
transfer means arranged near said first end portion of said document table and supported by said cover means, for transferring the guided document onto said document table from said first end portion, positioning the transferred document on said document table, with one end of the document aligned with said first end portion of said document table, and discharging the document located on said document table from said first end portion to the outside of the apparatus,
discharge means for discharging the discharged document onto said cover means,
a document holder supported by said cover means to be movable between a lower position where the holder is brought into contact with the document table to hold a document placed on said document table and an upper position where it is separated from the document table, and means for moving the document holder to the upper position when a document is to be transferred and discharged by said transferring means.

* * * * *